G. HUNTER.
METHOD OF EXTRACTING TREES AND STUMPS FROM THE SOIL BY MEANS OF EXPLOSIVES.
APPLICATION FILED NOV. 14, 1908.

917,441.

Patented Apr. 6, 1909.

WITNESSES
E. G. Bromley
E. B. Marshall

INVENTOR
Gordon Hunter
BY Munn & Co.
ATTORNEYS

THE NORRIS PETERS CO., WASHINGTON, D. C.

UNITED STATES PATENT OFFICE.

GORDON HUNTER, OF VICTORIA, BRITISH COLUMBIA, CANADA.

METHOD OF EXTRACTING TREES AND STUMPS FROM THE SOIL BY MEANS OF EXPLOSIVES.

No. 917,441.  Specification of Letters Patent.  Patented April 6, 1909.

Application filed November 14, 1908. Serial No. 462,599.

*To all whom it may concern:*

Be it known that I, GORDON HUNTER, a subject of the King of Great Britain, and a resident of Victoria, in the Province of British Columbia and Dominion of Canada, have invented a new and Improved Method of Extracting Trees and Stumps from the Soil by Means of Explosives, of which the following is a full, clear, and exact description.

My invention relates to a new and improved method of extracting trees and stumps from the soil, the object of the invention being to so bind a tree or stump that when an explosive is used for its removal in the ordinary way, by putting it into a hole under the tree or stump, that it will direct the expanding gases downwardly to expend their energy on and about the roots, thereby extracting the roots in their entirety without unnecessarily tearing the tree apart.

Still other objects of the invention will appear in the following complete description.

In this specification I will describe the preferred form of my invention, but it will be understood that I do not limit myself thereto, as I consider myself entitled to all forms and embodiments of the invention which may be held to fall within the scope of the appended claims.

Reference is to be had to the accompanying drawings forming a part of this specification, in which similar characters of reference indicate corresponding parts in both the figures, in which—

Figure 1:
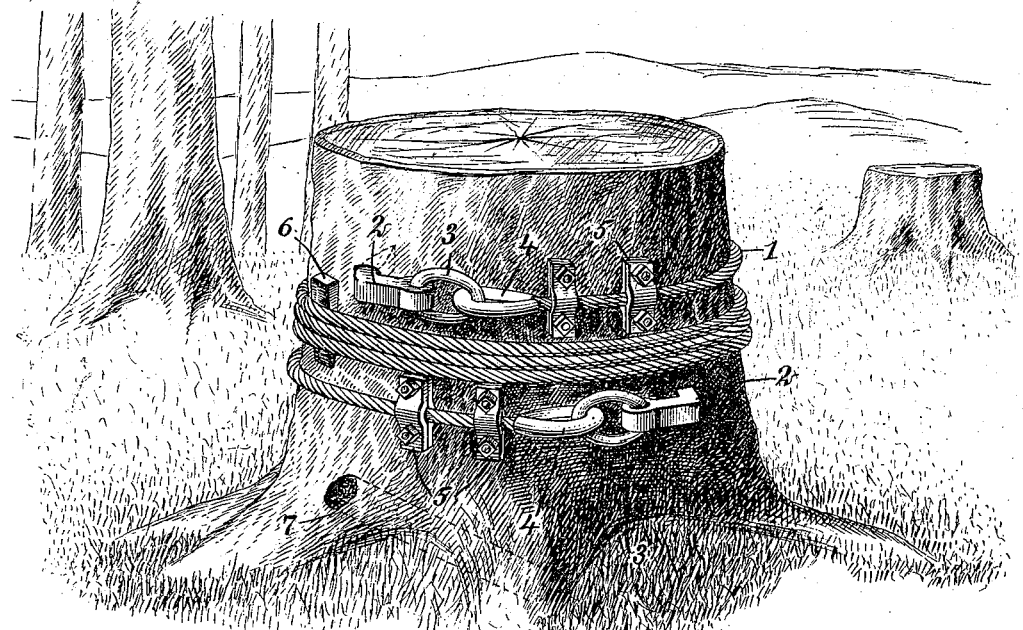
Figure 2:

Figure 1 is a perspective view showing a stump bound according to my method and a hole thereunder in which an explosive may be placed, and Fig. 2 shows a stump with the roots attached, after it has been forced from the earth by the explosion.

In using my method I provide a wire rope or cable 1, of a length and thickness varying according to the diameter of the tree or stump, the said rope or cable 1 having hooks 2 secured to its terminals, these hooks being either secured direct to the wire rope or cable 1 or being attached thereto by means of links 3. Preferably the eyes at the terminals of the rope are protected by sheaths 4 and the splices in the rope at the terminals are protected by clamps 5. The said rope is wound around the stump after one of the hooks 2 has been embedded in the stump, and after it has been wound taut the other hook 2 is embedded and by this means the stump is encircled by the wire rope or cable 1 and is bound together. If the stump is of irregular shape, wooden billets 6 are driven between the wire rope or cable and the stump, to prevent any play of the wire rope 1. The explosive is used in the ordinary way by putting it in a hole 7 which is made under the stump, and it is preferable to dispose the explosive well under the center of the tree to obtain the most beneficial results. The object of the rope wound as has been described, is to prevent the gas from ascending through the stump, which it does to a very great extent when used without something to bind the stump together immediately above the ground, but when the stump is bound as has been described the expanding gases are prevented from ascending and they, therefore, descend, expending their energy upon the roots, by which means the stump is extracted from the soil in its entirety, or nearly so, and it is also not necessary to use as much explosive as is customary when removing stumps in this manner without means to bind the stump together just above the ground.

Having thus described my invention, I claim as new and desire to secure by Letters Patent:

1. The method of removing trees and stumps from the soil, consisting in applying an explosive at the base of the tree, in binding the trunk of the tree together just above the ground to prevent the upward escape of the expanding gases and in detonating the explosive, substantially as has been described.

2. The method of removing trees and stumps from the soil, consisting in applying an explosive at the base of the tree or stump, in binding the trunk together with a cable having hooks at its terminals which are embedded in the tree and in detonating the explosive.

In testimony whereof I have signed my name to this specification in the presence of two subscribing witnesses.

GORDON HUNTER.

Witnesses:
G. H. H. MACKAY,
B. H. TYRWHITT DRAKE.